Sept. 20, 1955   G. T. BUTLER   2,718,110
APPARATUS FOR GATHERING CROPS
Filed June 2, 1954   9 Sheets-Sheet 1
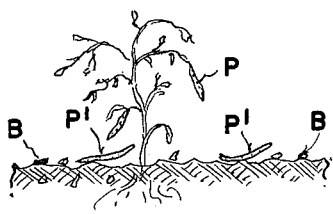
FIG. 1
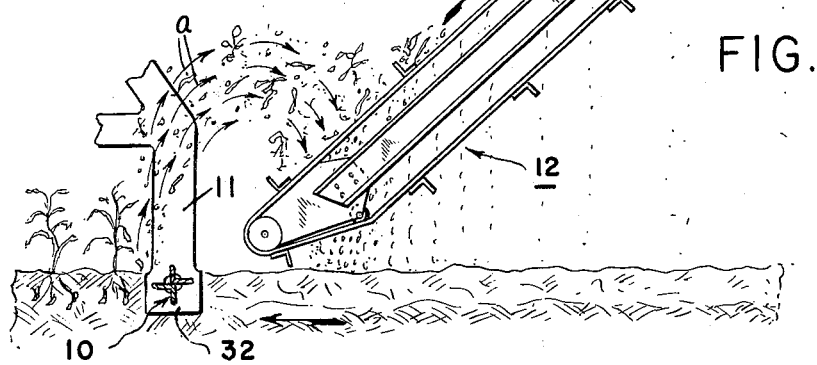
FIG. 2
FIG. 3   FIG. 4
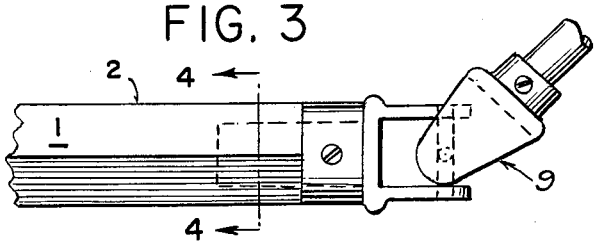 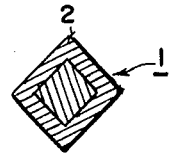
FIG. 5   FIG. 6
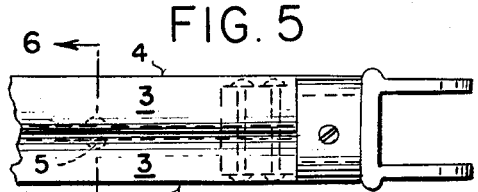 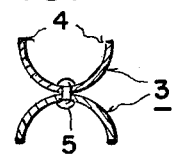
FIG. 7   FIG. 8
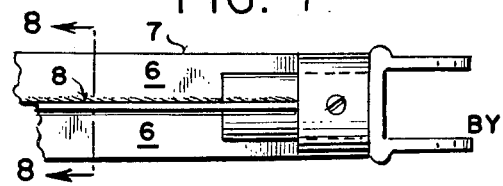 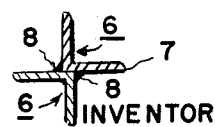
INVENTOR
GEORGE T. BUTLER,
BY Stone, Boyden & Mack,
ATTORNEYS.

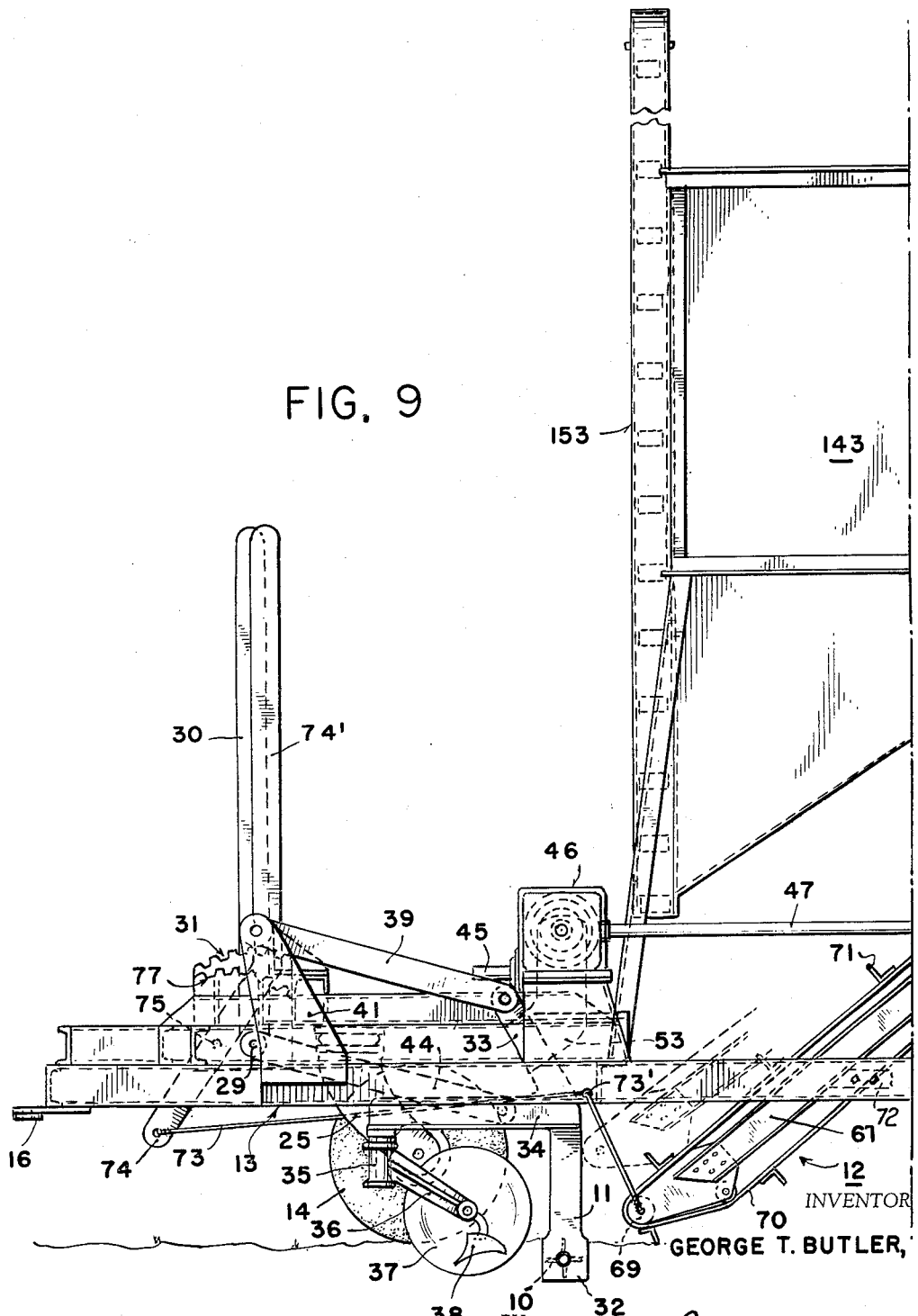

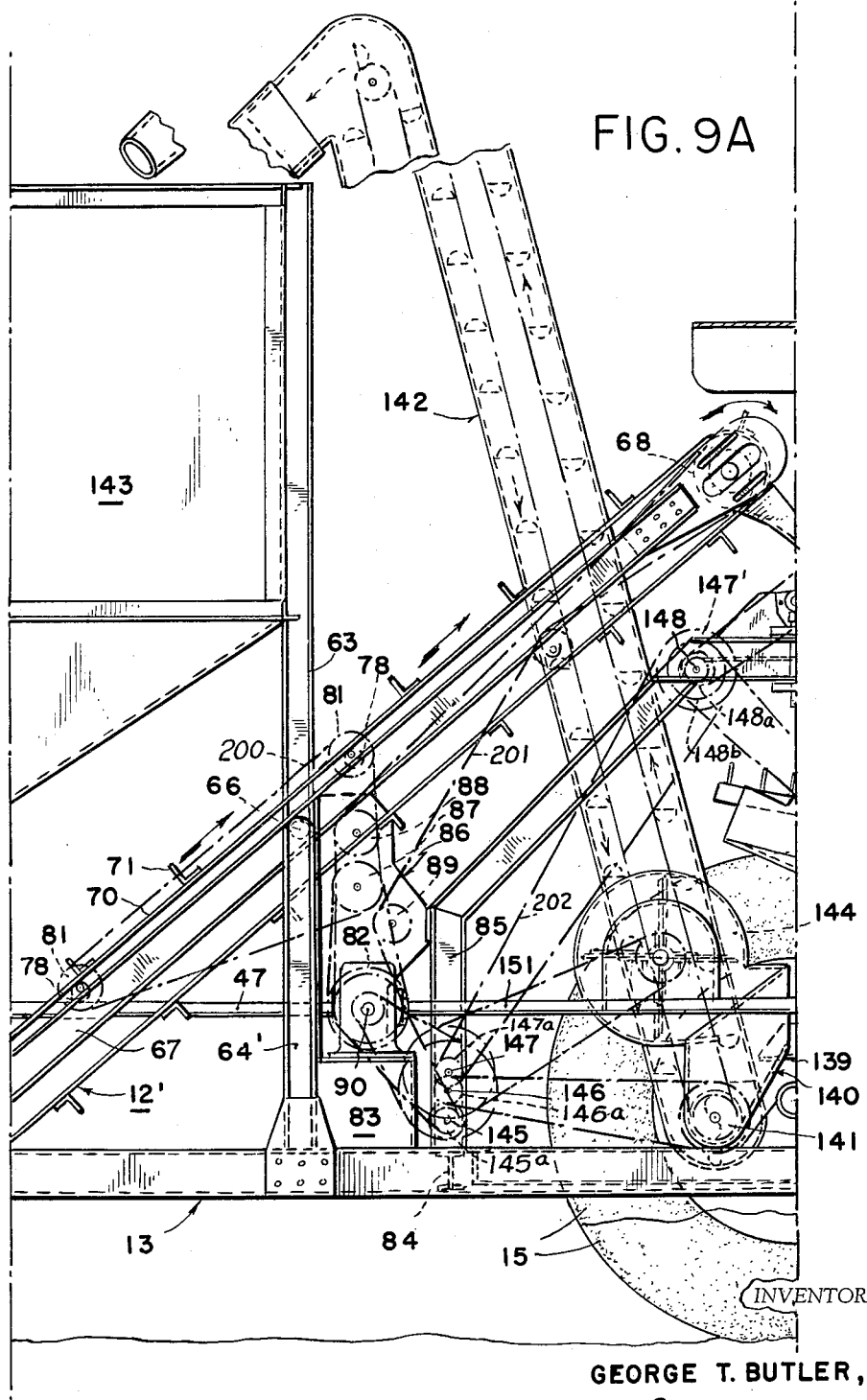

Sept. 20, 1955  G. T. BUTLER  2,718,110
APPARATUS FOR GATHERING CROPS
Filed June 2, 1954  9 Sheets-Sheet 4

INVENTOR
GEORGE T. BUTLER,
BY Stone, Boyden Mack,
ATTORNEYS.

Sept. 20, 1955  G. T. BUTLER  2,718,110
APPARATUS FOR GATHERING CROPS
Filed June 2, 1954  9 Sheets-Sheet 5
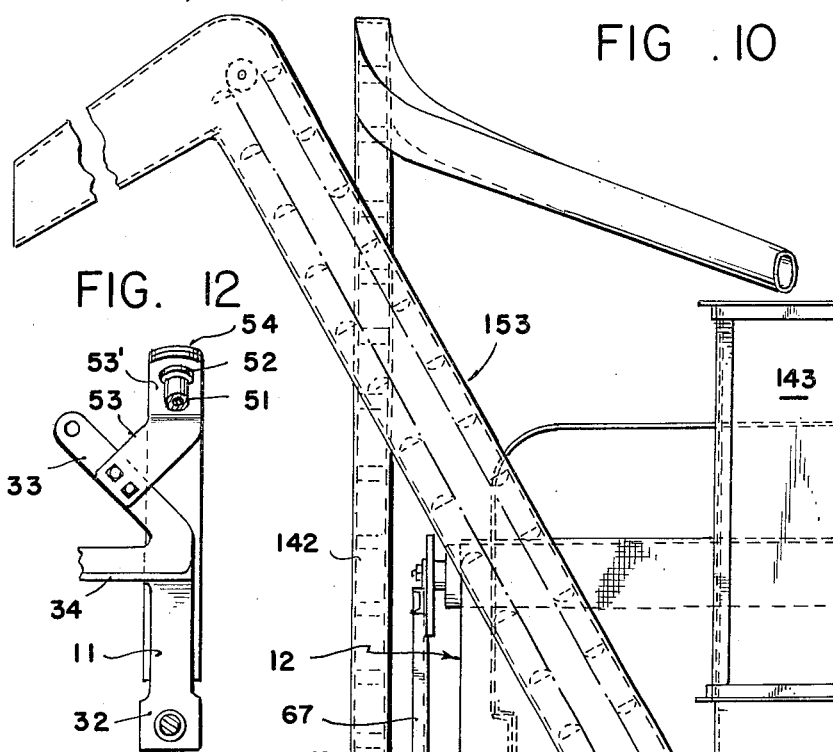
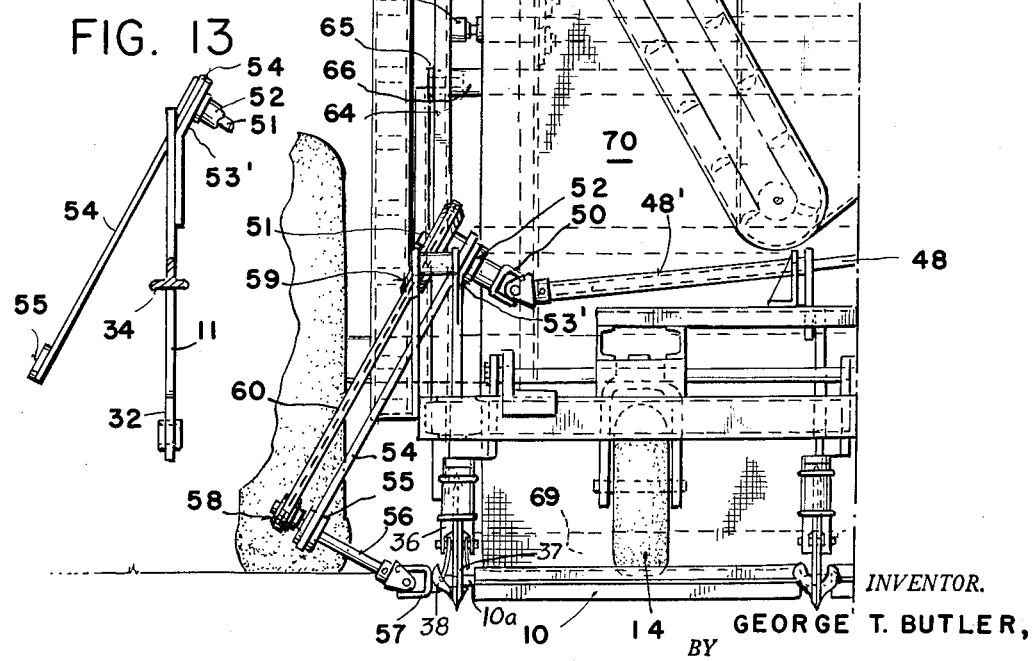
INVENTOR.
GEORGE T. BUTLER,
BY
Stone, Boyden + Mack,
Attorneys.

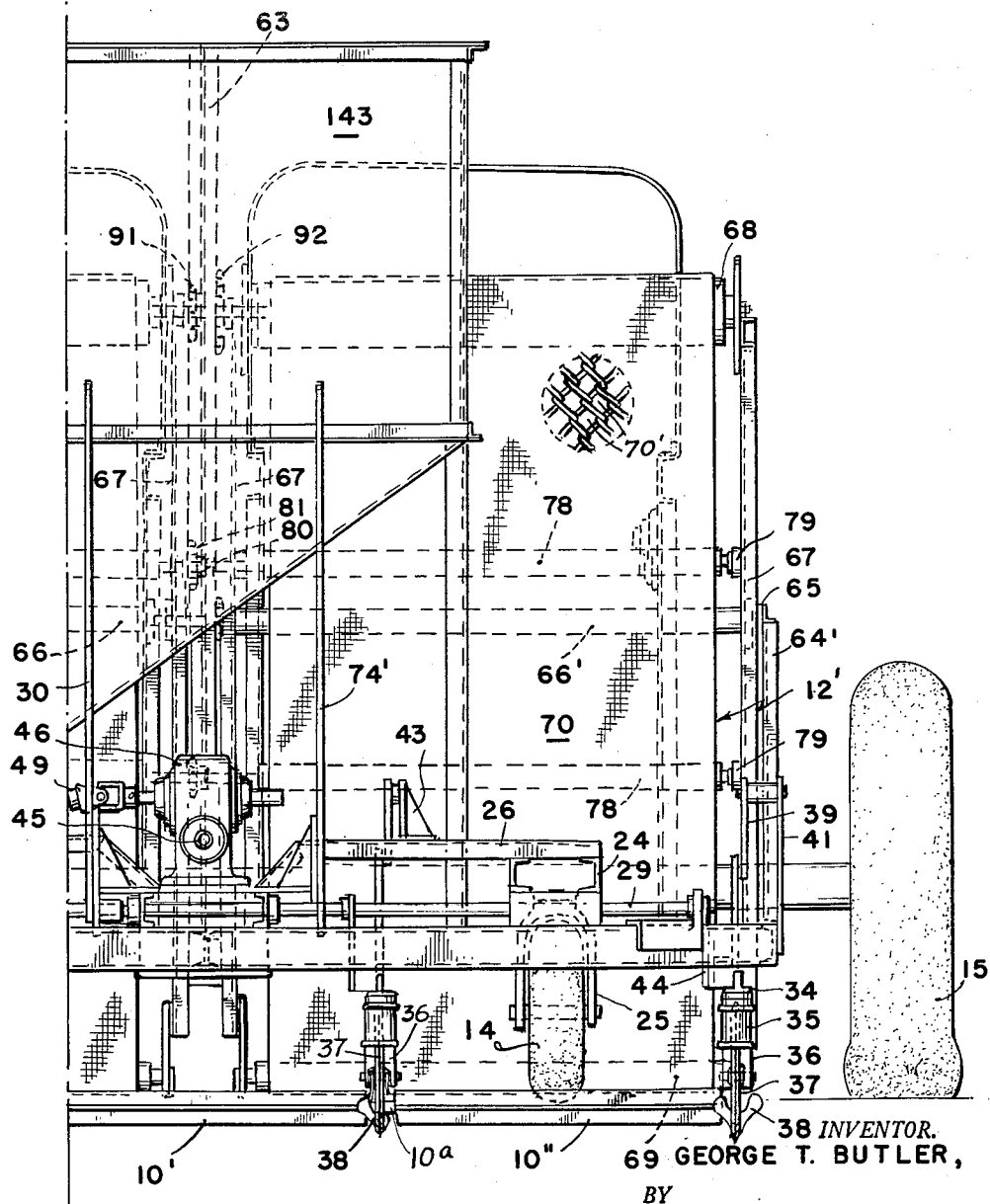

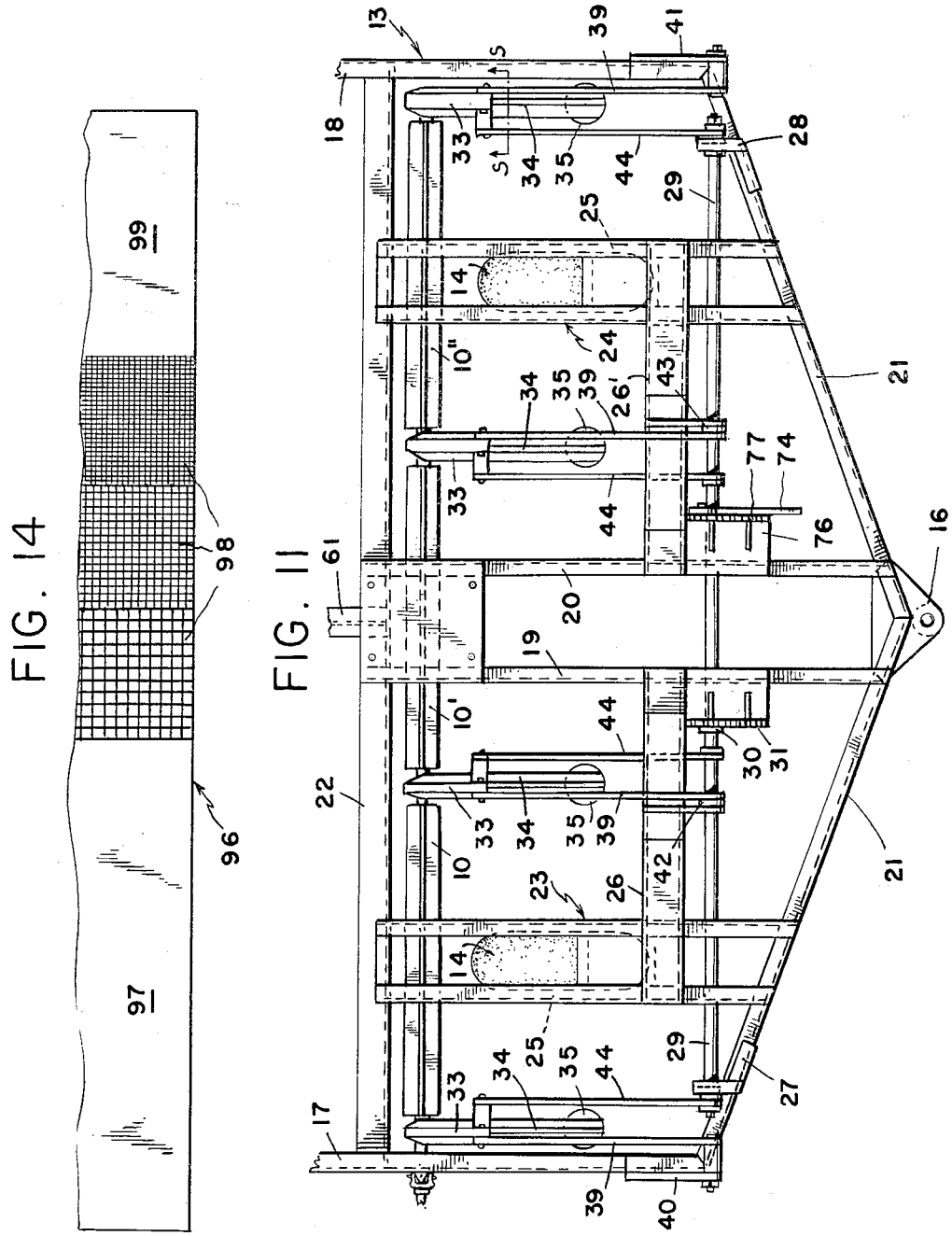

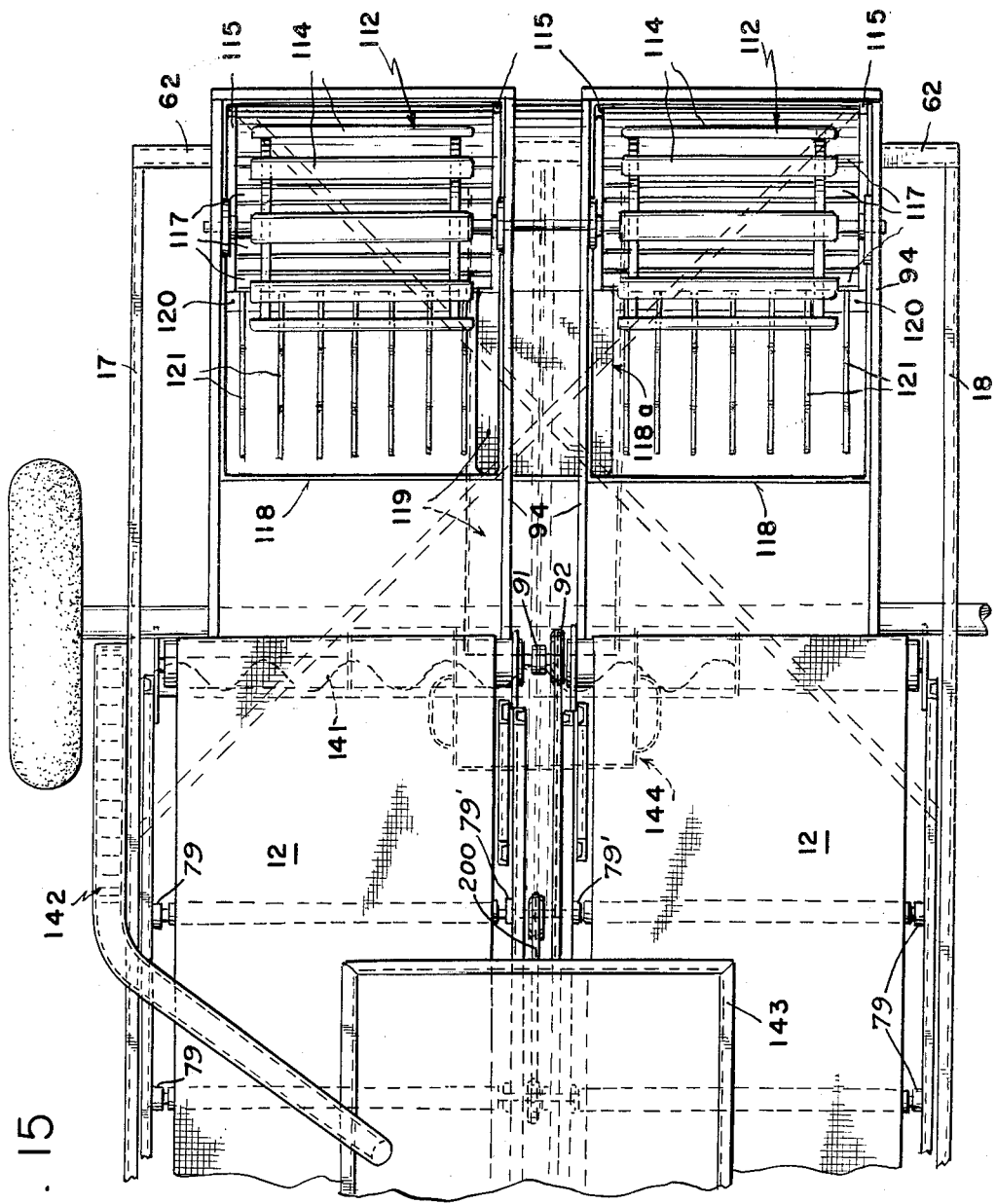

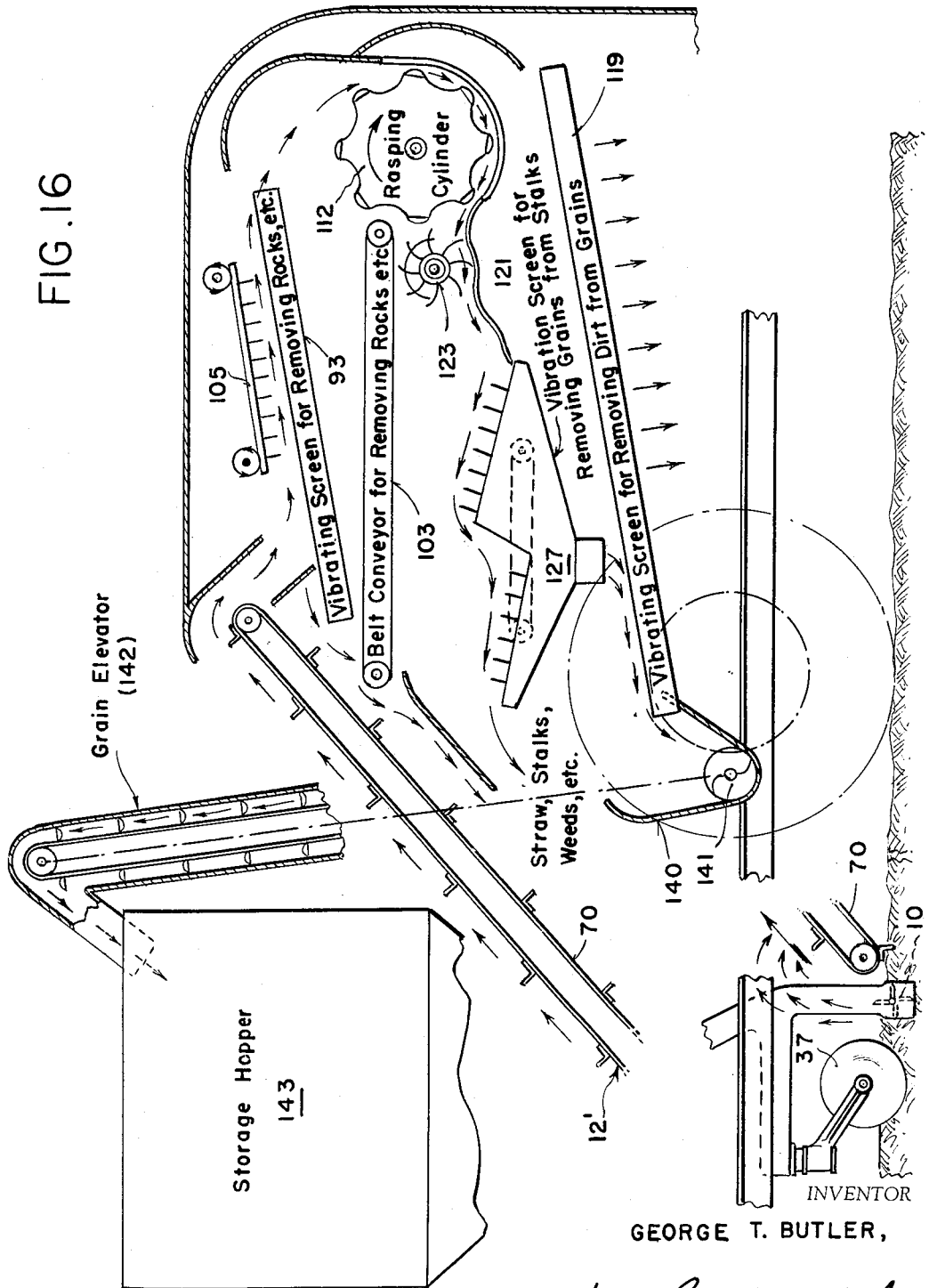

United States Patent Office 2,718,110
Patented Sept. 20, 1955

2,718,110

APPARATUS FOR GATHERING CROPS

George T. Butler, Scottsbluff, Nebr.

Application June 2, 1954, Serial No. 433,893

6 Claims. (Cl. 56—126)

This invention relates to apparatus for gathering crops, and particularly to an apparatus for salvaging crops such as beans, peas or wheat which have been shattered out and scattered on the ground. This application is a continuation-in-part of my copending application, Serial Number 221,478, filed April 17, 1951, now abandoned.

Many crops, including particularly beans, peas and wheat, are frequently allowed to stand until substantially mature and dry before harvesting, and it often happens that such a crop will be subjected to a windstorm or a hailstorm when in such substantially dry condition, with the result that the crop is shattered out, the beans, kernels of wheat, etc., being scattered over the earth. While, in such a case, a substantial amount of the crop may still be left standing, it is often not economically feasible to harvest the crop if that portion which is scattered cannot be recovered.

Considerable effort has been made in the past to devise a practical apparatus for salvaging crops which have thus been shattered out. It has been proposed, for example, to employ suction devices to pick up the scattered crop, but such devices have not been successful because the apparatus employed cannot produce sufficient suction to remove the beans or the like from the earth, especially if embedded therein. Attempts have also been made to brush the crop up from the ground, but this method too has proven unsatisfactory.

An object of the present invention is to provide an apparatus for substantially fully recovering from the ground a crop, such as beans, peas, wheat, or the like, which has been shattered out, even if embedded in the soil.

A further object of the invention is to devise such an apparatus wherein, since no attempt is made to separate the beans, kernels, etc., from the earth in the initial picking up of the crop, the shortcomings of the prior-art suction, brushing and like methods are completely overcome.

Another object is to provide such an apparatus which will recover and deliver the crop in fully cleaned condition, free from foreign matter.

Broadly stated, the invention is based upon the discovery that, instead of trying to pick up the crop by separating the beans, kernels, etc., from the ground upon which they lie and in which they are embedded, recovery can be effected by progressively pulverizing the earth, picking up the mixture of pulverized earth and the crop, and then separating the crop from the mixture.

For a complete understanding of the invention, reference is had to the accompanying drawings which form a part of this specification and wherein:

Fig. 1 illustrates, by way of example, the condition of a bean crop which has been partially shattered out and which the present invention may be employed to salvage;

Fig. 2 is a diagrammatic side elevation of parts of an apparatus constructed in accordance with the invention, showing the manner in which the crop is picked up from the ground;

Figs. 3, 5 and 7 are elevational detail views, on enlarged scale, of three types of earth pulverizing bars which may be employed in accordance with the invention;

Figure 9B:
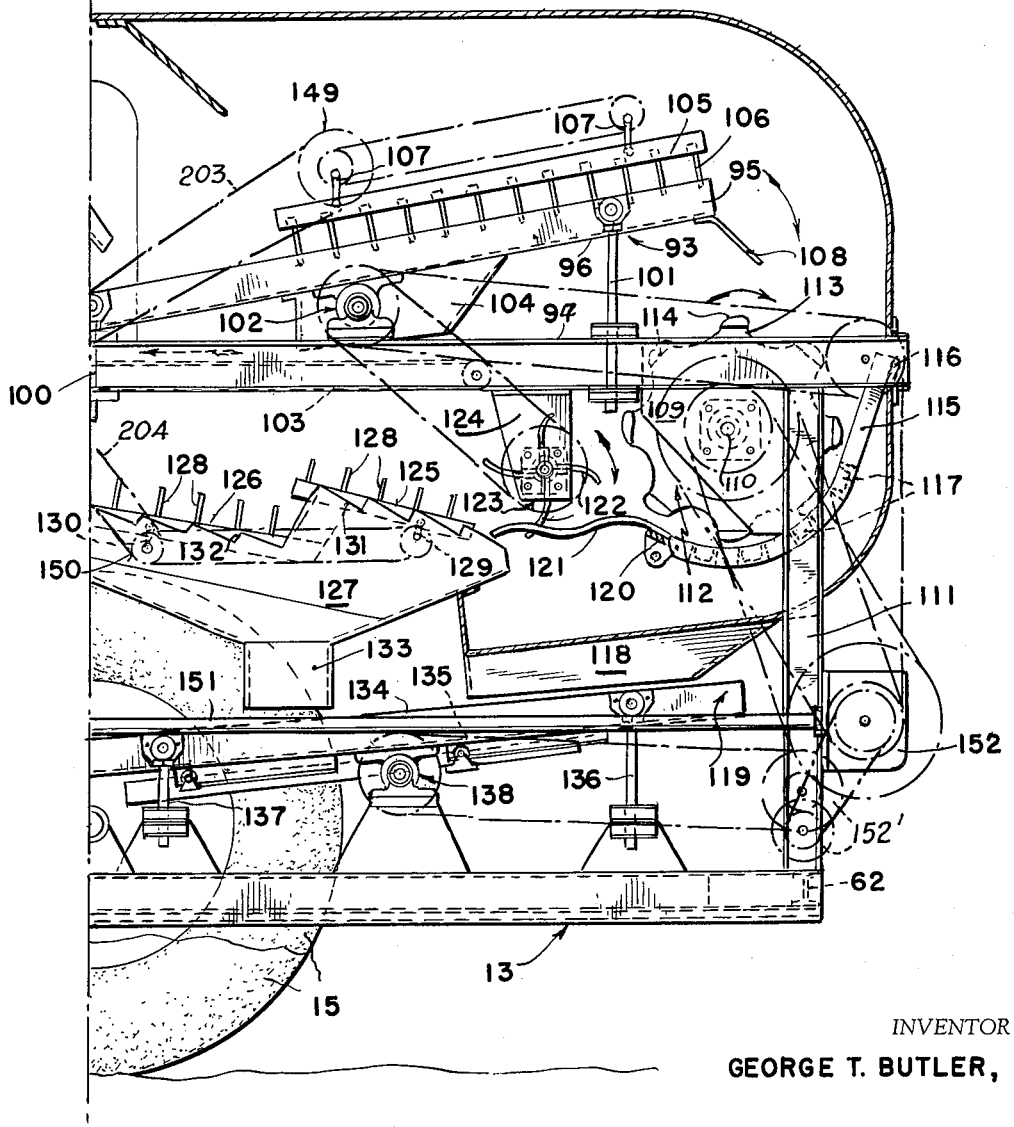

Figs. 4, 6 and 8 are transverse sectional views taken respectively on the lines 4—4 of Fig. 3, 6—6 of Fig. 5, and 8—8 of Fig. 7;

Figs. 9, 9A and 9B, in combination, illustrate a side elevation, with some parts broken away, of a preferred embodiment of an apparatus for carrying out my invention;

Figs. 10 and 10A, in combination, illustrate a front elevation, with some parts broken away, of apparatus shown in Figs. 9–9B;

Fig. 11 is a plan view of the forward portion of the apparatus shown in Figs. 9–9B.

Fig. 12 is a detail side elevation, with some parts in section, of a portion of the driving means for the earth pulverizing rod employed in the apparatus of Figs. 9–9B;

Fig. 13 is a detail front elevation, with part in section, of the mechanism shown in Fig. 12;

Fig. 14 is a fragmentary plan view of the screen element employed in a shaking separator which forms a part of the apparatus;

Fig. 15 is a plan view of a portion of the apparatus shown in Figs. 9–9B, illustrating details of the separating mechanism employed therein, and Fig. 16 is a flow sheet, showing some parts in section, illustrating the manner in which the crop is handled in the machine shown in Figs. 9–9B.

As has been stated, the invention is particularly concerned with gathering or salvaging crops which have been "shattered out." By the term "shattered out," I refer to the condition of a dry or substantially dry mature crop which has been scattered over the ground, as by wind, hail or heavy rain. When this occurs, some of the crop may still remain upon the plant, while individual kernels, etc., are both scattered over the surface of the earth and embedded therein. Thus, in Fig. 1, I have shown the general condition resulting from the partial shattering out of a bean crop. Here, it will be noted that the plant still carries some pods P, while other pods P', which may be partially shelled by the action of the storm, are scattered over the ground. Individual beans B lie scattered about upon the surface of the soil and are also embedded therein, some being even fully covered, as shown.

By the present invention, no effort is made to "pick up" the beans or the like selectively from the ground, as has been attempted by the prior-art suction and brushing machines. Rather, the earth at and immediately adjacent the surface is pulverized and the pulverized earth, intermixed with the crop, is projected upwardly into the air, the mixture then being caught before it falls to the ground. Thus, during the first stage of my process, the crop, including individual beans, kernels or the like, plants or vines, pods, etc., is picked up mixed with pulverized earth, small stones, etc., no attempt at selection being made. After this mixture has been picked up, the earth and stones are separated out, any pods, etc., are threshed to recover their contents, and the pods, vines, etc., are then separated out to leave the desired clean crop.

In picking up the crop, I employ a device of the kind heretofore employed as a "rod weeder." By this term, I refer to a bar which is positioned horizontally beneath the surface of the earth, rapidly rotated and moved along transversely under the ground as it rotates, so as to progressively pulverize the earth at the ground line. The rod weeder bar is characterized by having at least one exposed sharp corner or edge extending lengthwise of the bar. The bar may comprise a solid rod of polygonal cross-section, or may be made up of separate pieces. For example, in Figs. 3 and 4, a simple square rod 1 is shown, presenting four exposed sharp edges 2 extending lengthwise of the rod. Or, as seen in Figs. 5 and 6, the bar may be made up by fastening together, back-to-back, a pair of elongated members 3 each having a semi-circular cross-section and being of sheet form, so as to present four sharp edges 4. In such case, the members 3 may be secured together by means of rivets or the like 5. Similarly, the bar may be formed by securing two angle bars 6 together, as seen in Figs. 7 and 8, so that the four "arms" of the structure extend radially outward to terminate in sharp edges 7. Here, the angle bars may be secured together by welding, as at 8.

As will be shown hereinafter, the bar is provided with suitable bearings journalled in supporting members mounted on a mobile frame, so that the bar can be positioned beneath the surface of the earth and there be rotated at relatively high speed. As seen in Fig. 3, the bar is provided at one end with a suitable universal joint 9, whereby rotary motion may be imparted thereto. As the bar is rotated, the exposed sharp edges thereon cut into the solid earth, simultaneously pulverizing the same and projecting the pulverized earth upwardly into the air.

This action is illustrated in Fig. 2, where a typical bar designated by the reference numeral 10 is shown as positioned beneath the surface by means of a supporting arm 11, the bar being rotated clockwise to pulverize the earth and project the earth and crop upwardly into the air as shown by the arrows a. In order to collect the mixture of earth and crop before it falls to the ground, an upwardly and rearwardly slanting endless foraminous or perforate conveyor 12 is positioned with its lower end adjacent the ground behind the bar 10. As will be shown, the conveyor and the bar supporting arms are carried by a mobile frame, and the entire machine is advanced along the ground so that the bar, which extends transversely of the frame, moves along under the surface of the earth and the conveyor trails immediately behind the rod. As the bar advances and is rotated, it pulverizes the earth and the pulverized earth is thrown off tangentially, the angle of travel of the earth, that is, its upward angle relative to the ground level, depending upon the speed of rotation of the rod. Being projected upwardly into the air, the pulverized earth, carrying the crop, will of course follow a parabolic path, so that it would descend to the conveyor immediately behind the bar. Of course, the entire machine is also advancing along the ground, so that the conveyor has a tendency to move forwardly under the pulverized earth as the earth travels through the air. Thus, the mixture of pulverized earth and crop projected upwardly by the bar 10 is caught by the conveyor 12 and carried upwardly and rearwardly thereby.

I have referred to the pulverizing bar as being positioned "beneath the surface of the ground." In this respect, I have found that the best results are obtained when the bar 10 is inserted into the ground so that its longitudinal axis is entirely beneath the surface of the earth, but the depth of insertion being such that the exposed longitudinal edges 2, 4 or 7, Figs. 3–8, are slightly above the ground level, or are even with the ground level, at the uppermost point in their rotational travel. When this condition is obtained, I find that the action of the bar 10 is such as to project the earth and crop forcibly into the air. Of course, if the bar is inserted too far into the ground, its efficiency in upwardly projecting the pulverized earth and crop is decreased.

I find that the bar should be rotated at a speed of at least about 200 revolutions per minute in order to adequately pulverize the earth and project the mixed earth and crop upwardly into the air. I prefer to so construct the driving means for the bar that the bar will be driven at a rate in the range of from about 200 to about 450 revolutions per minute, depending upon the particular nature of the soil and the crop. I have found that highly satisfactory operation can be obtained if the diameter of the bar is from about 1½" to about 2½", though the precise dimensions may be considerably varied to meet the particular conditions of use involved.

A preferred apparatus constructed in accordance with my invention will now be described in detail. Referring to Figs. 9, 9A and 9B, the apparatus includes a mobile frame 13 supported by ground wheels 14 and 15 and provided at the front with any suitable hitch 16, so that the frame may be drawn along the ground by a tractor or the like (not shown). As shown in Figs. 10, 10A and 11, the frame 13 includes two outer longitudinal beams 17 and 18 and a pair of central longitudinal beams 19 and 20. At the forward end of the machine, the longitudinal beams 17–20 are connected by a forward cross member 21, with beams 19 and 20 terminating at a second cross member 22 spaced somewhat to the rear of member 21, these two members being bridged by composite longitudinal members 23 and 24, as shown. The forward ground wheels 14 are carried by yokes 25, Figs. 9 and 10, depending from and swivelling on the members 23 and 24. Aligned cross members 26 and 26' connect members 19 and 23 and 20 and 24, respectively. The forward transverse frame member 21 carries a pair of upwardly extending brackets 27 and 28, the brackets being located one at each side of the frame, as shown. Journalled at its end in these brackets is a transverse rock shaft 29, the shaft also being bearinged in center frame elements 19 and 20. To rock the shaft 29, there is provided a manually operated lever 30 equipped with a suitable movable detent, not shown, to cooperate with the rack segment 31 mounted on frame member 19, the lever 30 being rigidly connected to shaft 29.

The bar 10, illustrated as of the type detailed in Figs. 7 and 8, extends transversely of the machine, below and just forwardly of the cross member 22, and is made up of three sections 10, 10' and 10", as best seen in Fig. 10–10A. Between each of these sections, and at each end of the assembled bar the bar comprises plain bearing portions, as at 10$^a$, Fig. 10, of circular cross-section, each plain bearing section being journalled in the earth-penetrating portion 32, Fig. 9, of a downwardly depending supporting arm 11. Each arm 11 extends upwardly to join a forwardly slanting portion 33 and a horizontal, forwardly extending coulter-supporting arm 34. A vertical swivel bearing 35 depends from the forward end of each arm 34 and carries a rearwardly and downwardly extending caster frame 36 carrying a free rotating coulter disc 37. Positioned on each side of each coulter and carried by the frames 36 are small earth-deflecting plows 38. The coulter discs 37 are provided for the purpose of opening a way through the earth for the earth-penetrating portions 32 of the bar supporting arms 11, and in this function are aided by the plows 38. As best understood from Figs. 10 and 10A, the plows 38 also deflect the earth and crop into the path of the operative portions 10, 10' and 10" of the bar.

Each of the forwardly slanting portions 33 is pivoted at its upper end to the end of the corresponding one of a plurality of links 39. The two outermost links 39 have their other ends pivoted to stationary brackets 40 and 41 which extend upwardly from side frame members 17 and 18, respectively, as seen in Figs. 9 and 11. The two innermost links 39 have their other ends pivoted to stationary brackets 42 and 43 which extend upwardly from frame members 26 and 26', respectively. For each supporting arm 11 there is provided a second link 44, each of the links 44 being secured at one end to the rock bar 29 and pivoted at the other end to the corresponding ones of the coulter-supported arms 34. The effective lengths of the links 39 and 44 are equal, so that there is provided for each downwardly extending supporting arm 11 a parallelogram type of linkage operable to simultaneously adjust the vertical positions of the supporting arms 11 and the coulters 37 relative to the mobile frame 13 upon manual operation of the lever 30 to rock the rock bar 29. When the lever 30 is pivoted forwardly, the rock bar 29 is rotated to pivot links 44 upwardly, raising the assembly. When the lever 30 is pivoted rearwardly, the rock bar 29 is rotated to pivot links 44 downwardly, lowering the assembly, so that the coulters 37 and the bar 10 enter the ground. The depth to which the bar 10 is inserted in the earth can thus be determined manually.

*The pulverizer bar driving mechanism*

The various working parts of the apparatus are driven through a conventional power take-off (not shown) from the tractor or the like (not shown) which draws the apparatus, the power take-off being connected by any suitable means to rotate the input shaft 45 of a gear box 46. The gear box 46 is mounted upon the central frame members 19 and 20, directly above the lowered position of the bar 10, and through its gears applies rotary motion from the input shaft 45 to a rearwardly extending shaft 47 and a laterally extending shaft 48 via a universal joint 49, as seen in Fig. 10A. The shaft 48 is of polygonal cross-section and is fitted within a tube 48' of similar cross-section, as seen in Fig. 10, this tube terminating in a universal joint 50 connected to shaft 51. Shaft 51 rotates in a bearing 52 mounted on a bracket 53, the bracket 53 being carried by the portion 33 of outermost supporting arm 11 on the left hand side of the machine as it is viewed in Fig. 10. Intermediate its ends, bracket 53 is bent to provide a portion 53' slanting upwardly toward the center of the machine, so that the shaft 51 is thus positioned at a downwardly slanting angle as seen in Figs. 10, 12 and 13. As shown by Figs. 12 and 13, the position of the bracket 53 on the portion 33 of supporting arm 11 is such that the shaft 51 is positioned on the center line of the arm 11 and is thus aligned with the pulverizing bar 10.

Rigidly secured to the outside surface of portion 53' of the bracket 53 is a supporting arm 54 which, as viewed from the front, slants downwardly and away from the machine, and, as viewed from the side, is vertically aligned with the arm 11. At its lower end, the support 54 is provided with a bearing 55 in which is journalled a stub shaft 56 carrying a universal joint 57 connected to the bar 10. At its outer end, the stub shaft 56 is provided with a sprocket wheel 58 lying in the same plane as a sprocket wheel 59 carried by the upper shaft 51, the two sprocket wheels being connected by a driving chain 60. Thus, rotary motion from the power take-off is applied by the gear box 46 to shaft 48, thence to shaft 51 and sprocket wheel 59, so driving chain 60, sprocket wheel 58, stub shaft 56 and the pulverizer bar 10. When, as a result of manual operation of lever 30 to rock shaft 29, the pulverizer bar assembly is raised, the entire driving assembly from the bar 10 through to shaft 48 is also raised, shaft 48 sliding in tube 48' to compensate for the change in spacing between universal joints 49 and 50 resulting from raising the assembly.

*The elevating conveyors, and mounting and drive mechanism therefor*

Forward longitudinal frame members 19 and 20, Fig. 11, extend only back to cross member 22. Thereafter, the central frame member consists of a single I-beam 61, Fig. 11, welded at its forward end to the cross member 22 and at its back to a cross member 62, Fig. 15. At approximately the mid-point of the machine, a vertical member 63 of any suitable form is mounted on and extends upwardly from the center beam 61. Two short uprights 64 and 64' are mounted on side frame members 17 and 18, respectively, and are transversely aligned with the upright 63. At the upper ends of the uprights 64 and 64', there are provided bearings 65 horizontally aligned with similar bearings mounted on the central upright 63, these bearings forming the pivots for the pivot shafts 66 and 66' of a pair of endless conveyors 12 and 12'.

The conveyors 12 and 12' each comprise spaced parallel side frames 67 supporting end rollers 68 and 69 over which run the endless conveyor elements 70. The conveyor elements 70 are foraminous belts made from wire mesh or equivalent perforate material so that the conveyors, besides elevating the material projected onto them by the bar 10, may also serve to effect an initial separation of the earth from the crop. The perforations 70', as seen in enlarged detail in Fig. 10A, of the belts 70 are, of course, made sufficiently fine to prevent the particular crop being handled from passing through the belts, so that the belts may be said to be in the nature of sieves. Suitable flights or pusher bars 71 are provided on the belts 70, extending transversely thereof, to maintain the material in position on the conveyors.

The conveyors 12 and 12' extend upwardly and rearwardly of the machine, behind the pulverizer bar 10, the angle at which they are disposed being adjustable by reason of the pivot shafts 66 and 66'. It will be noted that the lower ends of the conveyors are shown as positioned adjacent the ground surface immediately behind the pulverizer bar 10. In order to limit the downward tilting of the conveyors, suitable stops 72, to engage the conveyor side frames 67, are provided on the side beams 17 and 18 of the frame 13, as seen in Fig. 9. To raise the forward ends of the conveyors 12 and 12', there is provided for each conveyor an operating cable 73 extending through openings 73' in the side frame members 17 and 18 and fastened to the lower end 74 of a hand lever 74', Fig. 9. The lever 74' is pivoted at 75 to a bracket 76, Fig. 11, carried by longitudinal frame member 20, and is provided with any suitable detent (not shown) cooperating with a rack segment 77 carried by the bracket 76, to secure the hand lever in adjusted position.

Positioned immediately beneath and in contact with the upper run of each conveyor 12 and 12' are spaced eccentric rollers 78, as best seen in Fig. 9A, so that rotation of the rollers 78 will vibrate the upper runs of the conveyors to shake the material thereon, thus loosening the pulverized earth and causing it to pass more freely through the perforations of the belts 70. At their outer ends, the eccentric rollers 78 are journalled in suitable bearings 79. Four of the eccentric rollers are shown, arranged in two transversely aligned pairs. At their inner ends, the rollers are provided with shaft portions extending through bearings 79', Fig. 15, in the corresponding conveyor side frames 67, the shafts of each pair of rollers 78 being joined by a suitable coupling 80 to which is affixed a sprocket wheel 81, Fig. 10A.

Immediately behind the central upright 63, a gear box 82 is mounted on a base 83 carried by the horizontal center beam 61. The gear box 82 is driven from forward gear box 46 by the shaft 47, which passes through a suitable opening in the upright 63. Somewhat to the rear of upright 63 and extending upwardly from a cross member 84 are two transversely spaced upright frame members 85. A sprocket wheel supporting frame 86 is mounted on the members 85 and the central upright 63 and rotatably supports the shafts for sprocket wheels 87, 88 and 89. To rotate the eccentric rollers 78, a single driving chain 200 extends over the sprocket wheels 81 and 87, the latter being chain driven from lateral output shaft 90 of gear box 82. At the center of the machine, the shafts of end rollers 68 of the conveyors 12 and 12' are joined by a coupling 91, and one of the shafts is provided with a sprocket wheel 92, as seen in Fig. 10A. To drive the conveyor belts, a single chain 201 engages sprocket wheel 92, idling sprocket wheels 88 and 89, and a driving sprocket wheel (not shown) on the shaft 90 of the gear box.

It is thus seen that rotation of the gear box 82, deriving its motion from the power take-off through forward gear box 46, simultaneously drives the perforate conveyor belts 70, to elevate the material deposited thereon by the pulverizer bar 10, and rotates the eccentric rollers 78, to shake or vibrate the upper run of the conveyor belts to shake the pulverized earth from the crop.

The final separating mechanism

While the vibrating foraminous conveyor belts 70 serve to eliminate a major proportion of the pulverized earth from the mixture thrown up from the pulverizing bar 10, it is still necessary to remove the stones, remaining earth, vines, stalks, etc., from the crop before a commercially valuable product results. For this purpose, I prefer to employ the combination of a shaking separator which receives the discharge from the conveyor belts 70 and removes rocks, etc., and additional earth, a threshing device for shelling any remaining beans or peas from the pods, or for threshing out the heads of grain, etc., as the case may be, a vine shaker, and a final shaking table or sieve for removing any remaining earth.

To the rear and somewhat below the discharge end of each conveyor belt 70, as seen in Figs. 9A and 9B, there is positioned an upwardly and rearwardly inclined shaking table 93 carried by suitable longitudinal frame elements 94 and comprising spaced side bars 95 supporting a separator sheet or screen 96. As shown by Fig. 14, the sheet 96 includes a solid forward section 97, as of sheet metal, foraminous intermediate sections 98 of decreasing mesh size, and a final solid section 99. Each shaking table 93, Fig. 9B, is operated by a centrally located crank or eccentric driving mechanism 102 of any conventional type capable of imparting to the screen a vibratory motion involving both vertical reciprocation and slight longitudinal oscillation, the driving mechanism being operated at a speed such that the crop being handled will travel up the sheet 96. The ends of the tables 93 are provided with suitable slide rod type guides 100 and 101 pivoted at their upper ends to the side frames 95.

Beneath the shaking table 93, there is provided an endless conveyor 103 extending beyond the forward end of the shaking table. A chute 104 directs earth passing through the foraminous portions 98 of the table onto the conveyor. Above the shaking table 93 is situated a frame 105 carrying a plurality of depending fingers 106, constituting a comb, the frame being carried by spaced crank members 107. In operation, the eccentric 102 is driven to vibrate the shaking table, with the result that heavy objects, such as rocks, gravitate to the lower forward end of the table while grain, etc., travels upward to the discharge plate 108, most of the earth not separated by the elevating conveyors 12 and 12' being separated out by the foraminous portions 98. The earth and rocks separated out by the shaking table 93 are discharged onto the ground by a suitable chute, not shown. The cranks 107 are rotated counter-clockwise, so that the teeth 106 are moved in a manner to advance the vines, etc., up the inclined screen 96.

Brackets 109, Fig. 9B, carried by the frame members 94 and 111, are provided to support a pair of transversely aligned shafts 110 carrying the threshing cylinders or rollers 112. The cylinders 112 are provided with a plurality of axially extending ribs 113 carrying steel rasping bars 114. Starting at the rear of the cylinders 112 and extending downwardly, curving forwardly immediately beneath the cylinders, are a plurality of parallel transversely spaced bars 115 secured at their upper ends to a cross bar 116 carried by the frame members 94. The bars 115 extend close to the path of the bars 114 and are provided with transversely extending cleats 117. Beneath the cylinders 112 and the corresponding set of spaced bars 115 is a chute 118 positioned to receive material falling between the spaced bars 115. As seen in Fig. 15, the chute 118 converges toward the center of the machine, terminating in a discharge opening 118a, so as to deposit said material upon a single centrally located shaking table 119. At their forward ends, the spaced bars 115 are secured to a cross member 120 carried by the chute 118. The cross member 120 also serves as a mount for a plurality of transversely spaced parallel bars 121 which have a hill-and-dale configuration, as seen in Fig. 9B, the bars 121 being arranged in two sets corresponding in width to the cylinders 112, each set of bars 121 being positioned above the chute 118.

Material flowing by gravity off the discharge plate 108 of the shaking table 96, including beans, kernels of wheat, etc., as well as the vines or stalks of the crop and the pods, heads, or the like, depending upon the particular crop being handled, falls upon the corresponding cylinders 112, which are rotated clockwise as seen in Fig. 9B. As the cylinders 112 are turned, the material is forced between the transversely extending rasping bars 114 and the cleats 117, so that the pods, in the case of a crop of beans or peas, or the heads, in case of a grain crop, are shelled or threshed, with the beans, peas, kernels, etc., falling for the most part between the bars 115 and into the chute 118, thence to the shaking table 119. The vines, pods, etc., are carried forwardly onto the arms 121 and there meet the rotating fingers 122 of a beater 123 supported by brackets 124. The beater 123 is rotated clockwise, so that the fingers 122 thereof move the vines, etc., forwardly onto the shaking racks 125 and 126 of a vine shaker 127. The shaking racks 125, provided with upwardly extending fingers 128, are carried by crank members 129 and 130, respectively, which are rotated counter-clockwise. The sheet metal sides of the vine shakers 127 are provided with serrations 131 including forwardly exposed substantially upright portions 132, so that as the shaking racks are moved by the cranks, the vines are moved forwardly and, as the racks are lowered by the cranks, the vines catch upon the portions 132. A suitable chute, not shown, is provided at the forward end of each vine shaker 127 to carry the vines to the ground. The sides of the shakers 127 are slanted inwardly to terminate in a single chute 133 disposed centrally of the machine and arranged above the final shaking table 119, so that beans, peas, kernels of wheat, etc., removed from the vines by the shakers are deposited on the table 119.

The shaking table 119 is generally similar to the shaking table 93, including side frame members 134 and a foraminous screen 135 supported therebetween. At its ends, the table is supported by suitable slide rod type guides 136 and 137 pivoted at their upper ends to the side frames 134. The table is operated by a centrally located crank or eccentric drive mechanism 138 in the same manner as the upper shaking tables 93, but at such a speed that the crop will travel down the slanting screen 135. As seen in Fig. 9A, the forward end 139 of the shaking table 119 is disposed above a transversely extending trough 140, and a helical conveyor 141, Fig. 15, extends along the bottom of the trough. Shaking of the table 119 and its screen 135 effects a final separation of earth from the crop, and the cleaned crop is deposited in the trough, there being moved along by the conveyor 141, transversely of the machine, to a bucket type elevating conveyor 142 which delivers the crop to a storage bin 143.

There is only one shaking table 119, receiving the crop from two sets of threshing rollers, beaters and vine shakers. The discharge from the shaking table 119 is the final output of the separating mechanism of the machine. As a final separating adjunct, I provide a fan or blower 144 located immediately in front of the discharge end 139 of the table 119, as seen in Figs. 9A and 15, the blower functioning to pass air through the discharge of the table 119 and across the table itself, so as to remove any light foreign material, such as chaff, etc.

Journalled in each set of vertical frame members 85, Fig. 9A, are shafts 145, 146 and 147, driven by the gear box 82. These shafts carry sprocket wheels 145a, 146a and 147a, one of which drives a chain 202 engaged with a sprocket wheel 147' carried by a shaft 148, which is the forward shaft for the conveyor 103. Also carried by the shaft 148 are sprocket wheels 148a and 148b respectively engaged with chains 203 and 204 driving sprocket wheel 149, which turns the cranks 107 of the comb 105, Fig. 9B, and sprocket wheel 150, which turns the cranks 129 and 130 of the vine shaker 127, respectively. The blower 144 and the screw conveyor 141, Fig. 9A, are also driven from sprocket wheels carried by one of the shafts 145–147.

The gear box 82 also drives a power shaft 151 extending rearwardly at one side of the centrally disposed shaking table 119, the shaft 151 being connected to drive a third gear box 152, Fig. 9B, from which power is taken to drive the eccentrics 102 of tables 93, the beaters 123, the threshing rollers 112, and through suitable speed change gearing 152', the eccentric 138 of the lower shaking table 119, as shown.

*Summary of operation*

The general mode of operation of the apparatus is illustrated by the flow-sheet shown in Fig. 16.

With power being connected to the earth pulverizing bar 10 through the gear box 46, handle 30 is pivoted rearwardly to lower the bar 10 and the coulters 37 to the desired working position. The entire apparatus is then advanced along the ground and, as it advances, the mixture of pulverized earth and crop thrown up by the bar 10 continuously falls upon the conveyors 12 and 12'. Since the endless belts of the conveyors are foraminous, and the upper run of each conveyor is continuously vibrated by the eccentric rollers 78, a major proportion of the pulverized earth is separated from the mixture of crop and earth before the mixture is discharged from the conveyors.

From each conveyor 12, 12', the mixture is discharged onto one of the shaking tables 93, the rocks, etc., and most of the remaining earth there being separated out. The crop, which still includes vines, stalks, pods, etc., is then fed to the threshing rollers 112, there being one of these rollers for each shaking table 93. The threshing rollers serve to separate most of the crop from the pods, etc., with the crop falling between the bars 115 and through chutes 118 onto the final separating table 119. The vines and other plant debris pass forwardly from the threshing rollers through the beater 123 and over the vine shaker 127, so that the last vestiges of the crop are removed and deposited on the table 119. The cleaned beans, peas, wheat, etc., are discharged from the shaking table 119 into the trough 140 and are thence conveyed by the screw 141 and the bucket conveyor to the storage hopper 143.

As seen in Figs. 9 and 10, a discharge conveyor 153 is provided to transfer the cleaned crop from the storage bin 143.

I claim:

1. In a machine for salvaging crops such as beans, peas and grain which have been partially shattered out onto the ground, the combination of a mobile frame, a bar having at least one exposed sharp edge extending lengthwise thereof, said bar being disposed transversely of said frame, means carried by said frame and rotatably supporting said bar for operation beneath the surface of the ground, a longitudinally extending upwardly and rearwardly inclined endless conveyor mounted on said frame and disposed with its lower end adjacent the ground immediately behind said bar, and drive means operatively connected to said bar and constructed to rotate the same at a speed on the order of at least 200 revolutions per minute to simultaneously pulverize the earth at and immediately below the surface of the ground and project upwardly into the air above the lower end of said conveyor a continuous stream of material consisting of pulverized earth and said crop.

2. An apparatus for salvaging crops such as beans, peas and grain which have been partially shattered onto the ground comprising a mobile frame, a bar having at least one exposed sharp edge extending lengthwise thereof, means supporting said bar transversely of said frame for rotation beneath the surface of the ground, drive means operatively connected to said bar and constructed to rotate the same at a speed on the order of at least 200 revolutions per minute to simultaneously pulverize the earth at and immediately below the surface of the ground and project upwardly into the air a substantial distance above the ground a continuous stream of material consisting of pulverized earth and said crop, threshing and separating means mounted on said frame and constructed to finally separate the individual beans, peas or grain kernels from said mixture, conveyor means mounted on said frame and disposed to catch said stream as it falls and feed the same to said threshing and separating means, and drive means operatively connected to said conveyor.

3. In a machine for salvaging crops such as beans, peas and grain which have been partially shattered onto the ground, the combination of a mobile frame, vertically adjustable supporting members mounted on said frame and spaced transversely thereof, a bar extending transversely of said frame and rotatably mounted in said supporting members, said bar having at least one exposed sharp edge extending lengthwise thereof, means operatively associated with said supporting members for adjusting the same to position said bar beneath the surface of the ground, drive means operatively connected to said bar and constructed to rotate the same at a speed on the order of at least 200 revolutions per minute to simultaneously pulverize the earth at and immediately below the surface of the ground and project into the air a substantial distance above the ground a continuous stream of material consisting of pulverized earth and said crop, an elevating conveyor mounted on said frame and disposed with its lower end adjacent the ground immediately behind said bar to receive said stream of material as it falls, and drive means operatively connected to said conveyor.

4. In a machine for salvaging crops such as beans, peas and grain which have been partially shattered onto the ground, the combination of a mobile frame, a foraminous longitudinally extending upwardly and rearwardly inclined endless conveyor in the nature of a sieve mounted on said frame and disposed with its lower end adjacent the ground, the apertures of said conveyor being smaller than the beans, peas or kernels of grain to be recovered, a bar having at least one exposed sharp edge extending longitudinally thereof, means rotatably supporting said bar on said frame for operation beneath the surface of the ground immediately in advance of said conveyor, drive means operatively connected to said bar and and constructed to rotate the same at a speed on the order of at least 200 revolutions per minute to cause said bar to simultaneously pulverize the earth at and immediately below the surface of the ground and project into the air above the lower end of said conveyor a continuous stream of material consisting of a mixture of pulverized earth and said crop, and drive means operatively connected to said conveyor.

5. On a machine for recovering loose beans and the like scattered over the ground, the combination of a mobile frame, transversely spaced supporting members mounted on said frame for vertical adjustment relative thereto, a bar having at least one exposed sharp edge extending lengthwise thereof, said bar extending transversely of said frame and being rotatably mounted in said supporting members, means operatively connected to said supporting members and constructed to adjust said supporting members to position said bar beneath the surface of the ground, a plurality of rolling coulters mounted on said frame each in advance of a different one of said supporting members to open up the ground so that said supporting members may enter and pass through the same, an endless elevating conveyor carried by said frame and disposed with its lower end adjacent the ground at the rear of said bar, drive means operatively connected to said bar and constructed to rotate the same at a speed on the order of at least 200 revolutions per minute to cause said bar to simultaneously pulverize the earth at and immediately below the surface of the ground and project into the air above the lower end of said conveyor a continuous stream of material consisting of pulverized earth and the beans or like crop, and drive means operatively connected to said conveyor.

6. In a machine for gathering a loose crop scattered over the ground, the combination of a mobile frame, transversely spaced vertically adjustable supporting members carried by said frame, a bar extending transversely of said frame and rotatably mounted in said supporting members, said bar having at least one exposed sharp edge extending lengthwise thereof between said supporting members, means operatively connected to said supporting members for adjusting the same to position said bar beneath the surface of the ground, a plurality of deflecting plows carried by said frame and each positioned in advance of a different one of said supporting members to deflect the earth and crop into the path of that portion of said bar having said exposed sharp edge, drive means operatively connected to said bar and constructed to rotate the same at a speed on the order of at least 200 revolutions per minute to simultaneously pulverize the earth at and immediately below the ground surface and project into the air a substatnial distance above the ground a continuous stream of material consisting of pulverized earth and said crop, and an endless elevating conveyor carried by said frame and disposed with its lower end adjacent the ground immediately behind said bar to receive said stream of material as it falls.

No references cited.